United States Patent
Mayumi et al.

(10) Patent No.: US 7,965,517 B2
(45) Date of Patent: Jun. 21, 2011

(54) CONDUCTING ASSEMBLY FOR TAPPING SCREW AND ELECTRONIC DEVICE

(75) Inventors: Kazuya Mayumi, Asaka (JP); Shinji Suzuki, Asaka (JP); Takao Takasu, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 599 days.

(21) Appl. No.: 12/026,749

(22) Filed: Feb. 6, 2008

(65) Prior Publication Data
US 2008/0186692 A1 Aug. 7, 2008

(30) Foreign Application Priority Data

Feb. 6, 2007 (JP) ................. 2007-026297

(51) Int. Cl.
*H05K 9/00* (2006.01)

(52) U.S. Cl. ........ 361/753; 361/799; 361/800; 361/816; 361/818; 174/350

(58) Field of Classification Search .................. 361/753, 361/799, 800, 816, 818; 174/350, 377
See application file for complete search history.

(56) References Cited

U.S. PATENT DOCUMENTS

| | | | | | |
|---|---|---|---|---|---|
| 5,414,223 | A | * | 5/1995 | Suski et al. | 174/262 |
| 5,420,378 | A | * | 5/1995 | Estes et al. | 174/263 |
| 5,991,164 | A | * | 11/1999 | Saito et al. | 361/799 |
| 7,094,076 | B2 | * | 8/2006 | Hatakeyama | 439/97 |
| 7,125,312 | B2 | * | 10/2006 | Castanares et al. | 451/5 |
| 7,310,236 | B2 | * | 12/2007 | Takahashi et al. | 361/757 |
| 7,529,104 | B2 | * | 5/2009 | Ito | 361/800 |
| 7,633,762 | B2 | * | 12/2009 | Yonezawa et al. | 361/753 |

FOREIGN PATENT DOCUMENTS

| | | |
|---|---|---|
| JP | 5243718 A | 9/1993 |
| JP | 69176 U | 2/1994 |
| JP | 716366 U | 3/1995 |
| JP | 882316 A | 3/1996 |
| JP | 1115054 A | 1/1999 |

\* cited by examiner

*Primary Examiner* — Dameon E Levi
(74) *Attorney, Agent, or Firm* — Sughrue Mion, PLLC

(57) ABSTRACT

A digital camera contains a circuit board and a battery box inside a housing. The housing and the battery box are made of plastic. The housing is fixed to the battery box with a tapping screw. A conductive plate for preventing the tapping screw from being charged is arranged between the housing and the battery box. Projections of the conductive plate penetrate into thread grooves of the tapping screw. The conductive plate transmits static electricity of the tapping screw to a grounding member of the circuit board.

9 Claims, 11 Drawing Sheets

INSERTION DIRECTION

CONDUCTING ASSEMBLY FOR TAPPING SCREW AND ELECTRONIC DEVICE

FIELD OF THE INVENTION

The present invention relates to a conducting assembly for a tapping screw that fixes an insulating member to an insulating housing. The present invention also relates to an electronic device including the conducting assembly for the tapping screw.

BACKGROUND OF THE INVENTION

Electronic devices, for example, digital cameras have a plastic housing whose external surface is finely finished. A taking lens is attached to a front surface of the housing and a liquid crystal display (LCD) is attached to a rear surface thereof. The housing contains a circuit board, electronic components, a battery box and the like inside. The housing is fixed to the battery box made of, for example, plastic.

A tapping screw is used for fixing the housing so that the loosening of the screw is avoided. A shank of the tapping screw is inserted from outside of the housing through a hole of the housing. The tapping screw is screwed while an end of the shank is forming an internal thread in a hole of the battery box. Since the tapping screw is in contact with the housing and the battery box both having insulating properties, static electricity may be generated by, for example, friction with the housing, and the tapping screw may be charged.

In general, the static electricity may cause malfunction of the digital camera or destroy the electronic components. As measures to prevent the charging, the components that are easily charged are connected to a negative electrode of a battery (see, for example, Japanese Patent Laid-open Publication No. 11-015054). The tapping screw may also be connected to the negative electrode of the battery via a conductive component. At this time, it is important to maintain good electric contact between the tapping screw and the conductive component.

When a common screw is used, a head of the screw is pressed against the conductive component or a shank of the screw is screwed in the conductive component, to provide good electric contact (see, for example, Japanese Patent Laid-open Publications No. 05-243718 and 08-082316, and Japanese Utility Model Laid-open Publications No. 06-009176 and 07-016366).

In the above digital camera, the shank of the tapping screw is screwed into the insulating battery box. It is therefore impossible to screw the shank in the conductive component. In that case, the conductive component may be put on the housing and interposed between the head of the tapping screw and the housing. However, such conducting assembly may deteriorate the appearance of the digital camera.

SUMMARY OF THE INVENTION

It is an object of the present invention to provide a conducting assembly for a tapping screw and an electronic device that make good electric contact without deteriorating the appearance.

In order to achieve the above and other objects, in an electronic device and a conducting assembly for a tapping screw according to the present invention, a conductive member electrically contacts with the tapping screw made of metal while being held between a housing and an insulating member. At the same time, the conductive member electrically connects with a grounding member serving as a reference potential. The conductive member has at least one projection that penetrates into a thread groove of the tapping screw.

The conductive member is preferably a metallic conductive plate having a thickness smaller than a thread pitch of the tapping screw.

The conductive plate has a through hole to which the tapping screw is inserted. The projection is formed on a periphery of this through hole.

When a diameter of a circle inscribed in a tip of the projection is $D_1$, a major diameter of external thread of the tapping screw is $D_2$, and a minor diameter of external thread of the tapping screw is $D_3$, the following condition is preferably satisfied: $D_3 < D_1 < D_2$.

The tip of the projection has a shape to follow an outer perimeter of the tapping screw, or the tip of the projection is sharp. At this time, the tip of the projection contacts with the tapping screw.

The projection may be curved in a tightening direction of the tapping screw. At this time, a side of the projection contacts with the tapping screw.

When more than one projection is formed, the projections are preferably formed at different intervals on the periphery of the through hole.

The projection may be bent toward an insertion direction of the tapping screw.

A plurality of slits radially extending from the through hole may be formed on the periphery of the through hole so as to form the projection between the adjacent two slits.

According to the present invention, the electronic device and the conducting assembly for the tapping screw include the conductive member that electrically connects with the grounding member at a reference potential, between the insulating housing and the insulating member. Owing to this, the charging of the tapping screw is prevented without influencing the appearance of the electronic device. Since the projection of the conductive member penetrates into the tread groove of the tapping screw, good electric contact between the tapping screw and the conductive member is provided.

The conductive member is the conductive plate having the thickness smaller than the thread pitch of the tapping screw. Owing to this, the conductive member of the present invention is advantageous in terms of space-saving.

Since the projection is formed on the periphery of the through hole to which the tapping screw is inserted, the projection penetrates into the thread groove of the tapping screw. For this configuration, it is unnecessary to form a burring for the through hole.

When the diameter of the circle inscribed in the tip of the projection is $D_1$, the major diameter of external thread of the tapping screw is $D_2$, and the minor diameter of external thread of the tapping screw is $D_3$, the following condition is satisfied: $D_3 < D_1 < D_2$. Owing to this, the tapping screw is reliably screwed into the through hole, and thereby reliably making the electric conduction between the tapping screw and the conductive plate.

When the tip of the projection has the shape to follow the outer perimeter of the tapping screw, the tip contacts with the tapping screw. For this configuration, the projection is prevented from getting stuck with the tapping screw. Therefore, the tapping screw can be easily retightened.

When the tip of the projection is sharp, the tip contacts with the tapping screw. For this configuration, the electric conduction between the tapping screw and the conductive plate is reliably made even if the tapping screw is covered with an insulating material since the sharp tip penetrates through the insulating material.

When the projection is curved in the tightening direction of the tapping screw, the side of the projection contacts with the tapping screw. For this configuration, the projection bows in a direction retracting from the tapping screw, which enables to screw the tapping screw with small torque.

When the projections are formed at different intervals on the periphery of the through hole, a thread ridge of the tapping screw is guided into a widest gap between the projections. Owing to this, threading initiation is facilitated.

When the projection is bent toward the insertion direction of the tapping screw, the projection guides the thread ridge of the tapping screw. Owing to this, the threading is easily started and the tightening torque is decreased.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

First Embodiment

Figure 1:
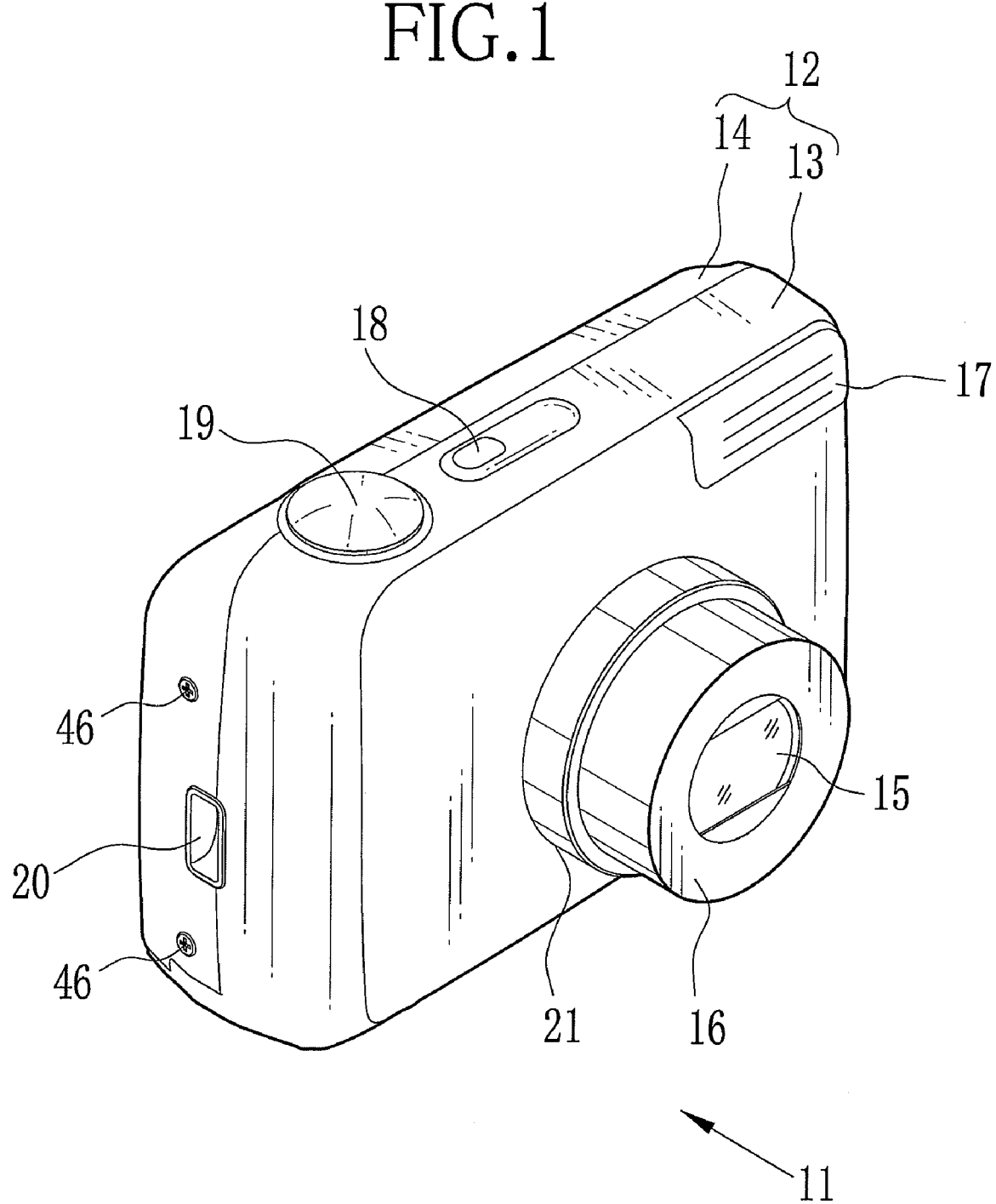
FIG. 1 is a perspective view illustrating a digital camera.

Hereinafter, a first embodiment of the present invention applied to a digital camera is explained. As shown in FIG. 1, a digital camera 11 has a housing 12 whose external surface is finely finished. The housing 12 is constituted of a front cover 13 and a rear cover 14 both made of plastic having insulating properties. A lens barrel 16 for holding a zoom lens optical system 15, a flash unit 17, and the like are provided at front surface of the housing 12.

On a top surface of the housing 12, a power button 18, a shutter release button 19, and the like are provided. On a lateral surface of the digital camera 11, an input-output terminal 20 is provided.

When the power of the digital camera 11 is off, the collapsible lens barrel 16 is contained in a lens barrel container 21 formed at the front surface of the housing 12. When the power of the digital camera 11 is turned on, the lens barrel 16 protrudes forward from the housing 12 and stops at a wide angle end.

When capturing images, a zoom operation section (not shown) provided at a rear surface of the housing 12 is firstly operated, and thereby the focal length of the zoom lens optical system 15 is adjusted in consideration of a distance from a subject and a size of the subject. When the shutter release button 19 is pressed halfway, an auto focus device known in the art is operated and performs the focusing of the zoom lens optical system 15. When the shutter release button 19 is fully pressed, the image capturing is performed with image sensors.

Figure 2:
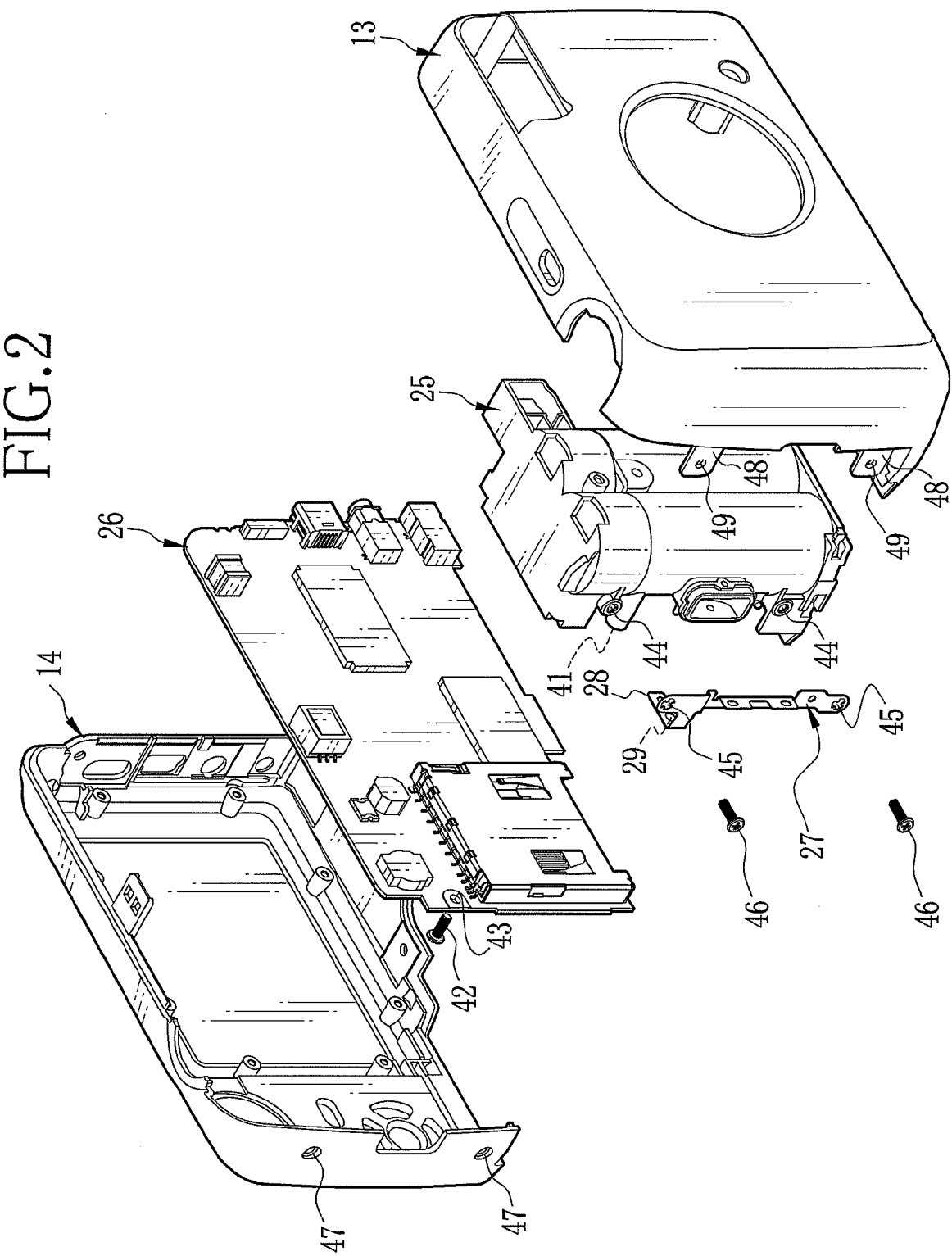
FIG. 2 is an exploded perspective view illustrating the digital camera.

As shown in FIG. 2, a battery box 25 that is made of, for example, a resin having insulating properties, and a circuit board 26 are provided inside the housing 12. The battery box 25 contains a battery that supplies electric power to the circuit board 26. On the circuit board 26, components, such as a CPU that takes overall control of each part of the digital camera 11, are mounted. The circuit board 26 is electrically connected to a grounding member (not shown) defining a reference potential. The grounding member may be a negative electrode of the battery or a 0 V output line of an electric wire circuit. A conductive plate 27 is attached to a lateral side of the battery box 25. For the sake of clarity, image capturing mechanisms such as the lens barrel 16 (see FIG. 1) and the image sensors (CCD), the buttons 18 and 19 (see FIG. 1), a LCD, and the like are not shown in FIG. 2.

Figure 3:
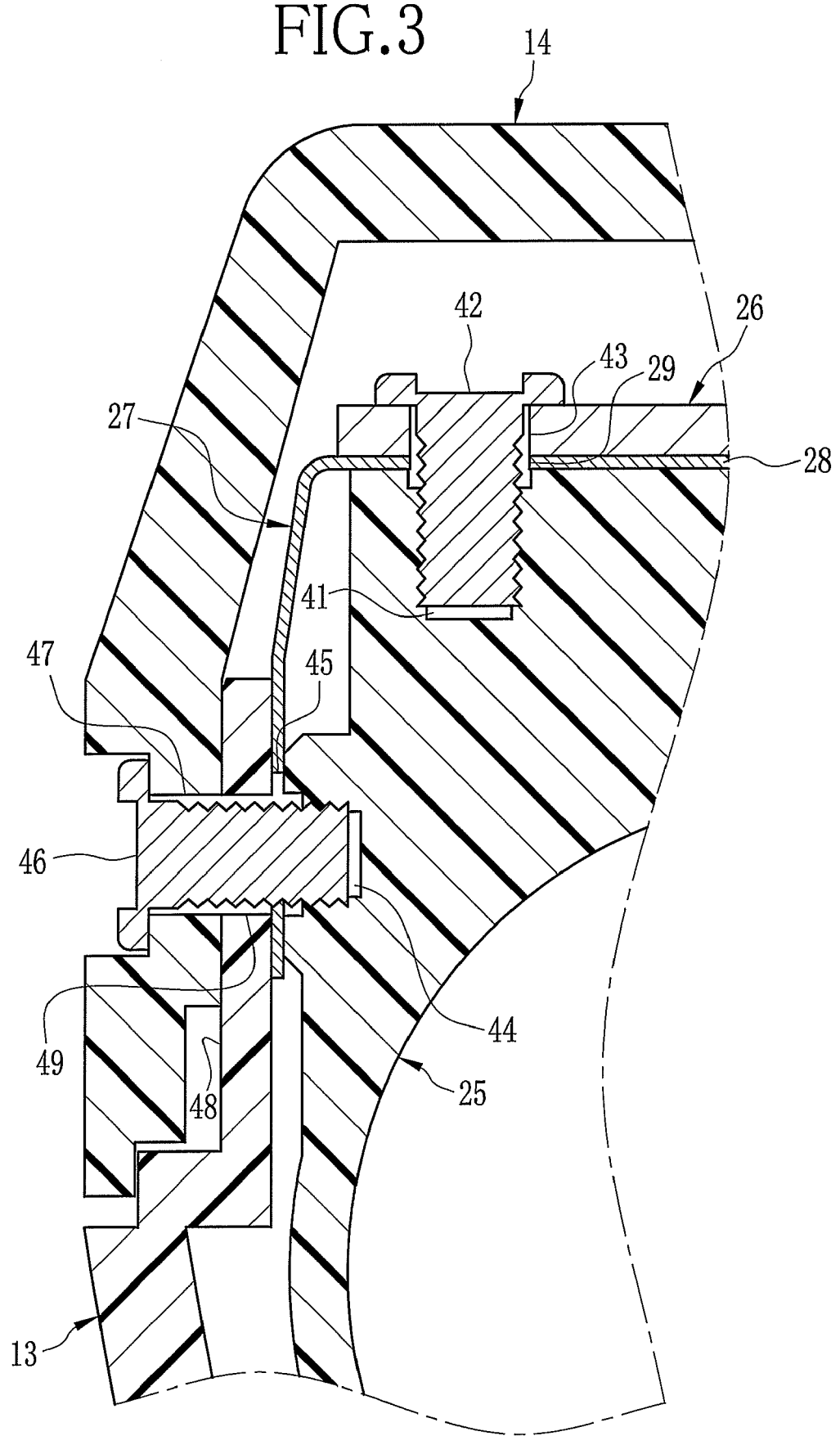
FIG. 3 is a sectional view illustrating a conducting assembly for a tapping screw.

As shown in FIG. 3, a screw hole 41 for threading a screw 42 is formed on a rear surface (rear cover 14 side) of the battery box 25. A through hole 43 to which the screw 42 is inserted is formed on the circuit board 26. The conductive plate 27, which is attached to the lateral side of the battery box 25, has a retainer 28. The retainer 28 is bent toward the rear side of the battery box 25. A through hole 29 to which the screw 42 is inserted is formed on the retainer 28. The screw 42 is inserted to the through hole 43 of the circuit board 26 and then to the through hole 29 of the conductive plate 27, and threaded into the screw hole 41 of the battery box 25. Owing to this, the conductive plate 27 and the circuit board 26 are fixed to the battery box 25 while the conductive plate 27 and the circuit board 26 are electrically connected.

A pilot hole 44 to which a tapping screw 46 is threaded is formed on the lateral side of the battery box 25. The conductive plate 27 that is fixed to the battery box 25 has a through hole 45 to which the tapping screw 46 is inserted. On a lateral side of the rear cover 14, a through hole 47 to which the tapping screw 46 is inserted is formed. The front cover 13 has a retaining portion 48 that is placed inside the rear cover 14 when the front and rear covers 13 and 14 are fitted. The retaining portion 48 has a through hole 49 to which the tapping screw 46 is inserted. When the rear cover 14 and the front cover 13 are fitted such that the through holes 47 and 49 are coaxially arranged, the tapping screw 46 is inserted from outside of the housing 12 into the through hole 47 of the rear cover 14, the through hole 49 of the front cover 13 and the through hole 45 of the conductive plate 27 consecutively, and reaches the pilot hole 44 of the battery box 25. Then, the tapping screw 46 forms an internal thread in the pilot hole 44 and goes thereinto. Owing to this, the front and rear covers 13 and 14 are tightly closed, and the battery box 25 is fixed to the housing 12. The tapping screw 46 is made of metal such as, for example, iron or stainless steel. The conductive plate 27 and the tapping screw 46 are contacted and electrically conducted to each other. For this configuration, the tapping screw 46 is electrically connected to the circuit board 26 through the conductive plate 27, which prevents the charging of the tapping screw 46.

Figure 4A:
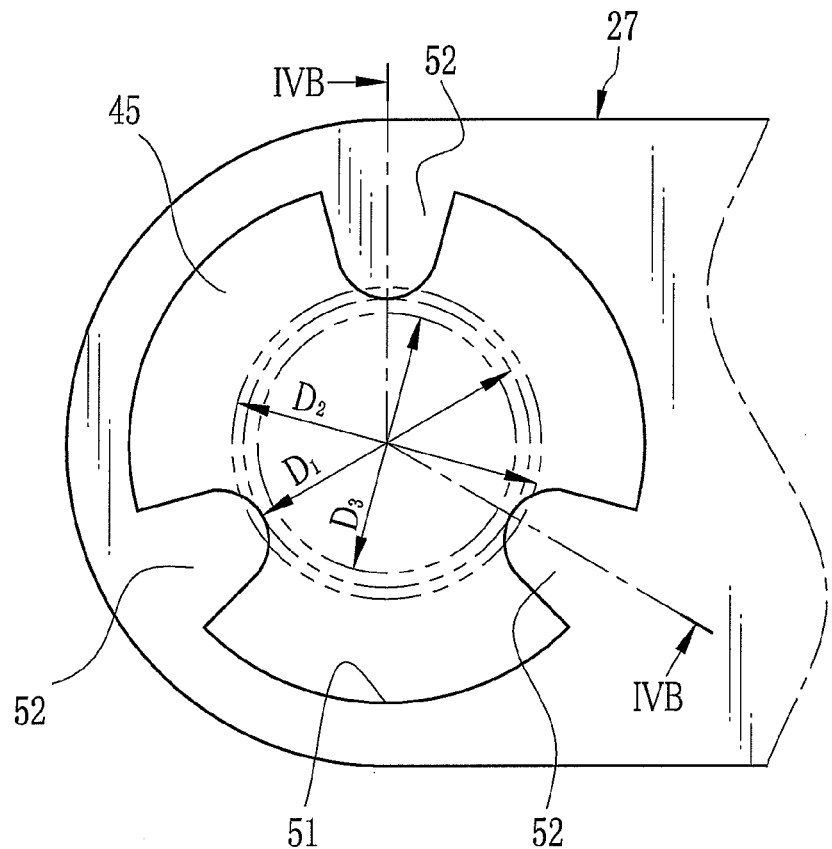
FIG. 4A is a plan view of a conductive plate according to a first embodiment and FIG. 4B is a sectional view illustrating the condition before screwing the tapping screw into the conductive plate taken along a line IVB-IVB of FIG. 4A.
Figure 4B:
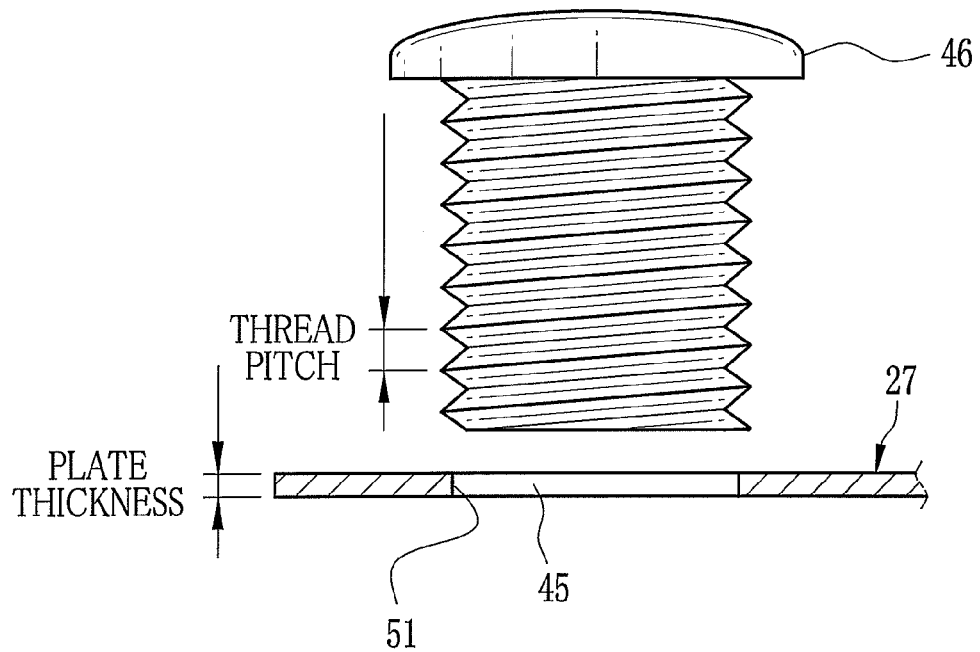

As shown in FIG. 4A, three projections 52 are formed on a periphery 51 of the through hole 45 of the conductive plate 27. The projections 52 are arranged at regular intervals along the periphery 51 of the through hole 45. A Tip of each projection 52 is rounded. A diameter $D_1$ of a circle inscribed in the tips of the projections 52 is smaller than a major diameter of external thread $D_2$ of the tapping screw 46, and is larger than a minor diameter of external thread $D_3$ of the tapping screw 46 ($D_3 < D_1 < D_2$). As shown in FIG. 4B, a thickness of the conductive plate 27 is smaller than the thread pitch of the tapping screw 46. The conductive plate 27 is made of a metallic plate like iron or stainless steel, and has elasticity. When the tapping screw 46 is screwed into the through hole 45, the tips of the projections 52 of the conductive plate 27 penetrate into the thread grooves of the tapping screw 46, and thereby the tips of the projections 52 reliably contact with the thread grooves. Owing to this, the conductive plate 27 and the tapping screw 46 are electrically connected. In addition, since the projections 52 of the conductive plate 27 contact with the tapping screw 46 and bow in an insertion direction of the tapping screw 46, the tightening load is decreased.

Second Embodiment

Figure 5:
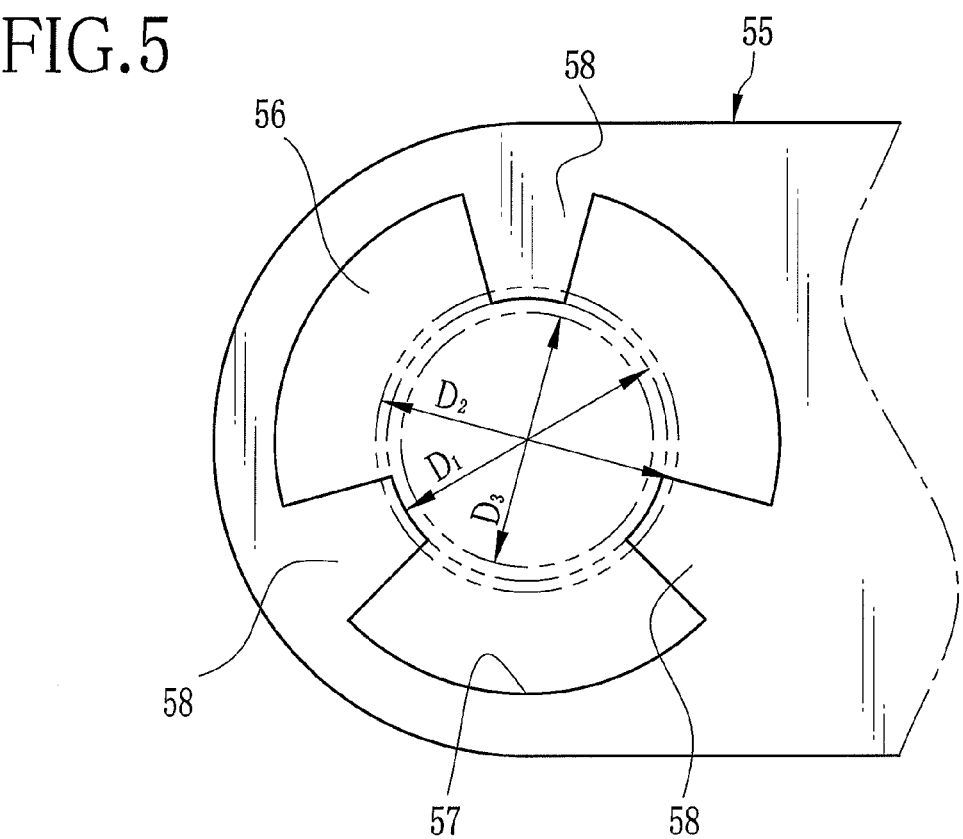
FIG. 5 is a plan view of a conductive plate according to a second embodiment.

In the first embodiment, the tapping screw 46 that is screwed into the through hole 45 of the conductive plate 27 contacts with the round tip of each projection 52. Therefore, the tapping screw 46 may get stuck with the tips of the projections 52 at the time of screwing. A conductive plate 55 according to a second embodiment shown in FIG. 5 prevents such problem. Three projections 58 are formed on a periphery 57 of a through hole 56 of the conductive plate 55. The projections 58 are arranged at regular intervals along the periphery 57 of the through hole 56. A Tip of each projection 58 has a shape to follow an outer perimeter of the tapping screw 46. The tips of the projections 58 of the conductive plate 55 penetrate into the thread grooves of the tapping screw 46 when the tapping screw 46 is screwed into the through hole 56. Owing to this, the conductive plate 55 and the metallic tapping screw 46 contact with each other, and the electric conduction is made between them. Since the tips of the projections 58 have the shape to follow the outer perimeter of the tapping screw 46, the tapping screw 46 is prevented from getting stuck with the projections 58 when threading the tapping screw 46.

Third Embodiment

Figure 6:
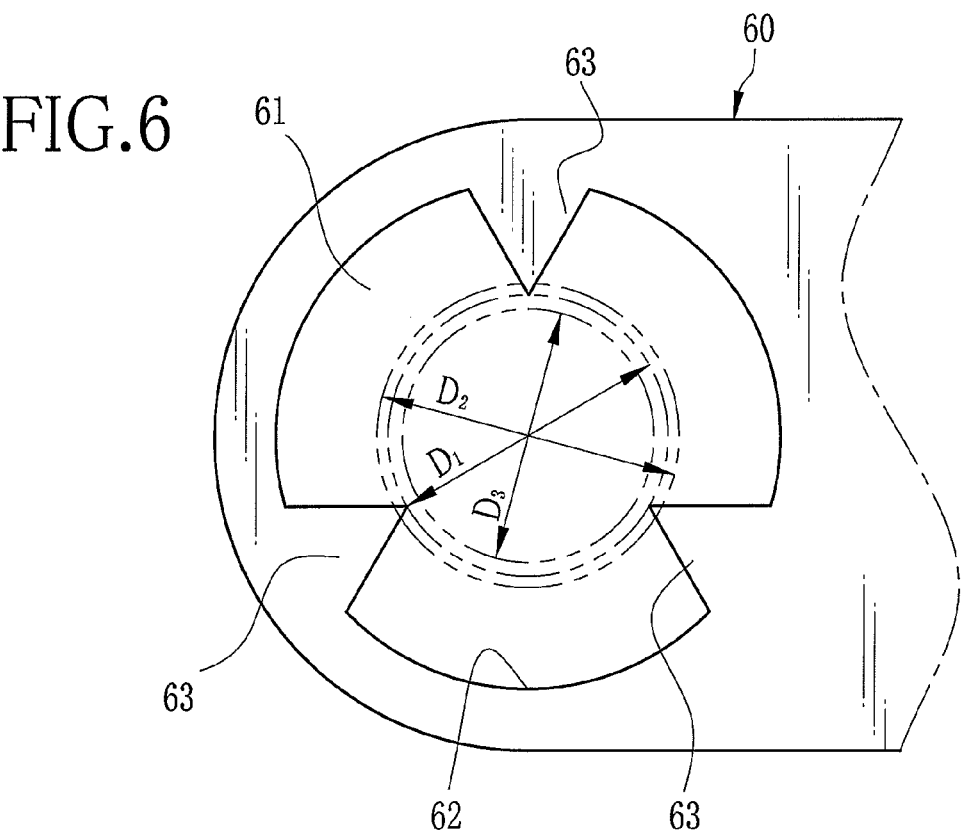
FIG. 6 is a plan view of a conductive plate according to a third embodiment.

When a surface of the tapping screw 46 is covered with an insulating material, the electric conduction between the metallic tapping screw 46 and the conductive plate 27 or 55 may not be made. In order to assure the electric conduction between the tapping screw 46 and the conductive plate, a conductive plate 60 shown in FIG. 6 is used. Three projections 63 are formed on a periphery 62 of a through hole 61 of the conductive plate 60. The projections 63 are arranged at regular intervals along the periphery 62 of the through hole 61. Tips of the projections 63 are formed sharp. The tips of the projections 63 of the conductive plate 60 penetrate into the thread grooves of the tapping screw 46 when the tapping screw 46 is screwed into the through hole 61. When the surface of the tapping screw 46 is covered with the insulating material, the tips of the projections 63 cut up the insulating material, and thereby reliably making the electric conduction between the tapping screw 46 and the conductive plate 60.

Fourth Embodiment

Figure 7:
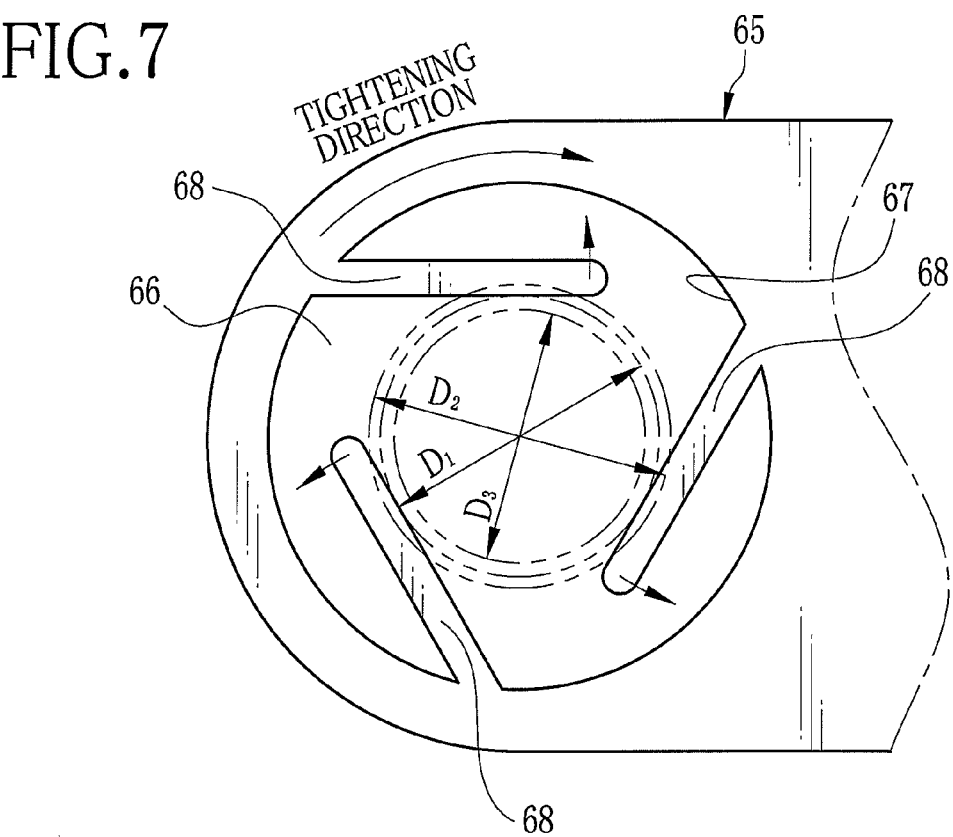
FIG. 7 is a plan view of a conductive plate according to a fourth embodiment.

The tapping screw 46 contacts with the projections 52 of the through hole 45, the projections 58 of the through hole 56, or the projections 63 of the through hole 61 when the tapping screw 46 is screwed into the through hole 45 of the conductive plate 27, the through hole 56 of the conductive plate 55, or the through hole 61 of the conductive plate 60. For such configuration, the projections 52, 58 or 63 may cause load in tightening the tapping screw 46. A conductive plate 65 shown in FIG. 7 prevents the projections from causing such load. Three projections 68 are formed on a periphery 67 of a through hole 66 of the conductive plate 65. The projections 68 are arranged at regular intervals along the periphery 67 of the through hole 66. The projections 68 are linearly extended in a tightening direction of the tapping screw 46. Sides of the projections 68 of the conductive plate 65 penetrate into the thread grooves of the tapping screw 46 when the tapping screw 46 is screwed into the through hole 66. When the sides of the projections 68 contact with the tapping screw 46, the projections 68 bow in a direction retracting from the tapping screw 46, which decreases the tightening torque.

Fifth Embodiment

Figure 8:
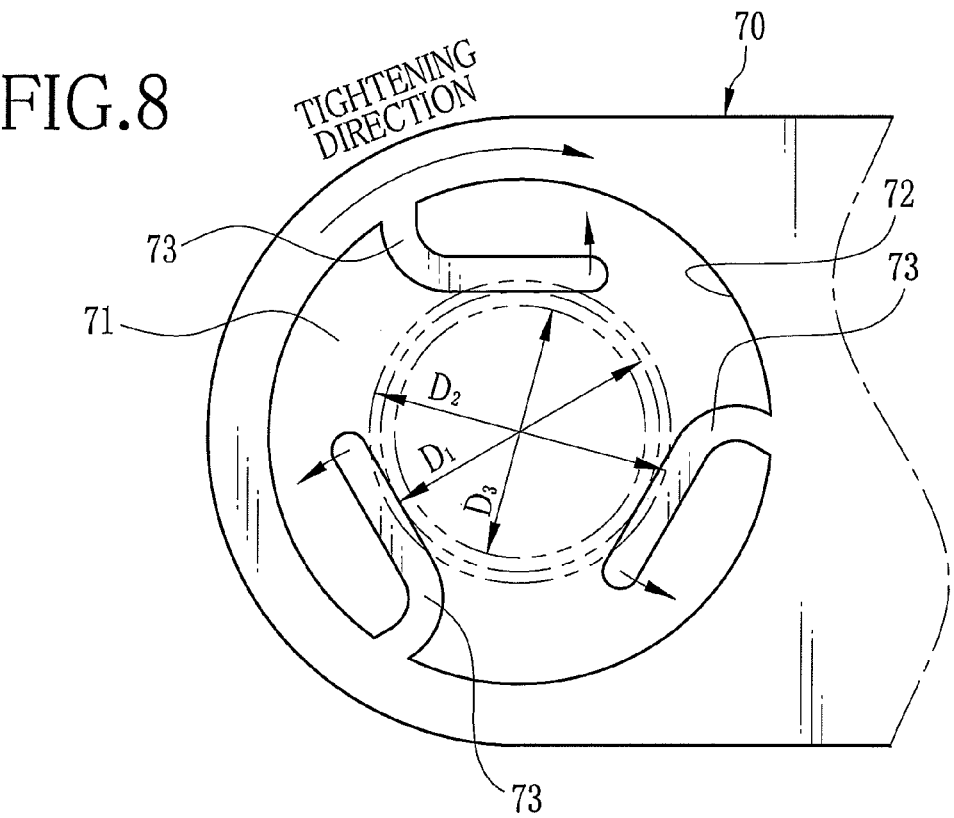
FIG. 8 is a plan view of a conductive plate according to a fifth embodiment.

As shown in FIG. 8, three L-shaped projections 73 are formed on a periphery 72 of a through hole 71 of a conductive plate 70. The projections 73 are arranged at regular intervals along the periphery 72 of the through hole 71. The projections 73 are bent in the tightening direction of the tapping screw 46. Sides of the projections 73 of the conductive plate 70 penetrate into the thread grooves of the tapping screw 46 when the tapping screw 46 is screwed into the through hole 71. When the sides of the projections 73 contact with the tapping screw 46, the projections 73 bow in the direction retracting from the tapping screw 46, which decreases the tightening torque.

Sixth Embodiment

Figure 9:
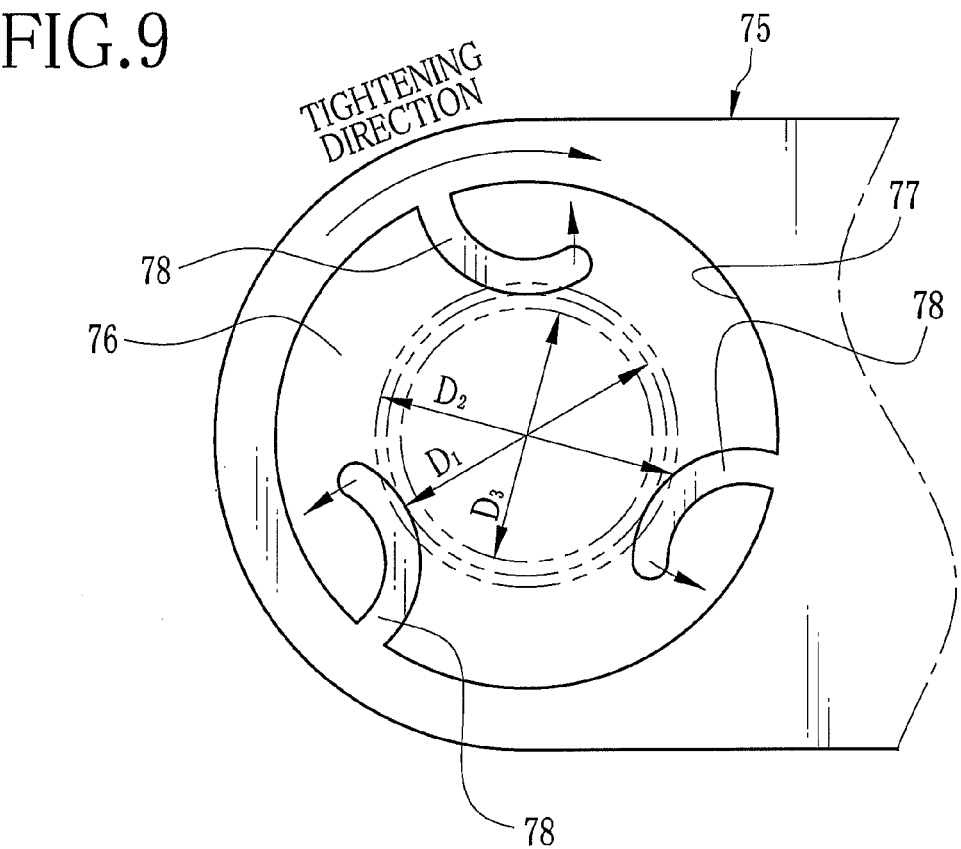
FIG. 9 is a plan view of a conductive plate according to a sixth embodiment.

As shown in FIG. 9, three circular projections 78 are formed on a periphery 77 of a through hole 76 of a conductive plate 75. The projections 78 are arranged at regular intervals along the periphery 77 of the through hole 76. The projections 78 are curved in the tightening direction of the tapping screw 46. When the tapping screw 46 is screwed into the through hole 76, sides of the projections 78 contact with the thread grooves of the tapping screw 46. Thereby, the projections 78 bow in the direction retracting from the tapping screw 46, which decreases the tightening torque.

Seventh Embodiment

Figure 10:
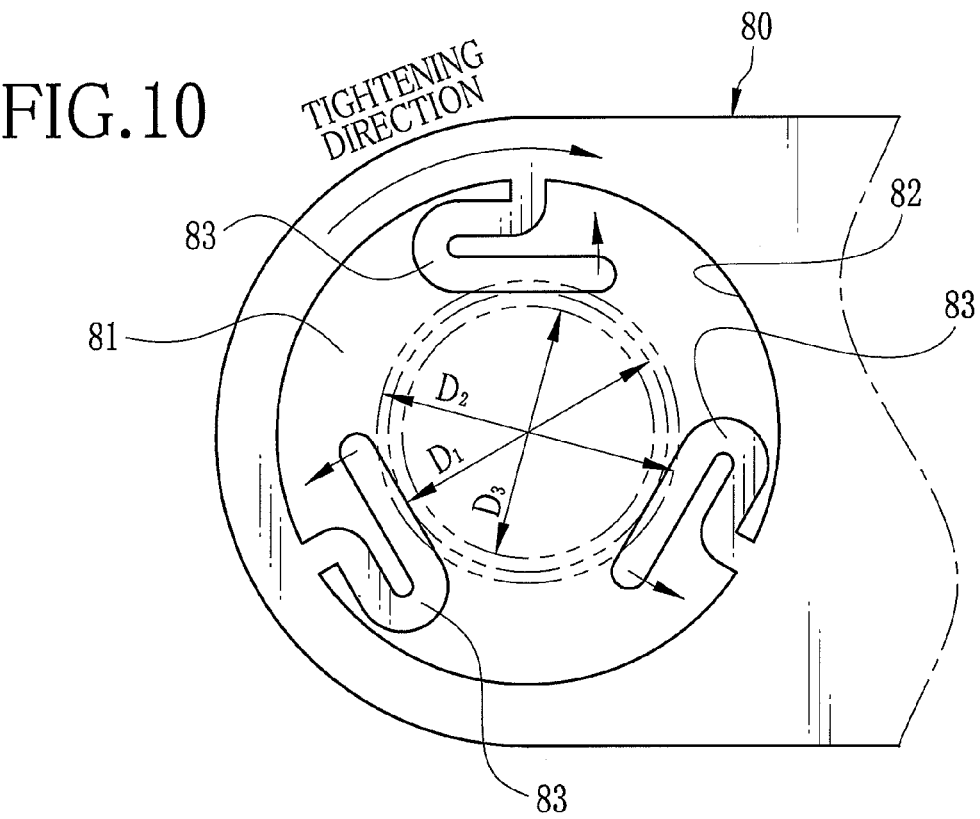
FIG. 10 is a plan view of a conductive plate according to a seventh embodiment.

As shown in FIG. 10, three projections 83 are formed on a periphery 82 of a through hole 81 of a conductive plate 80. The projections 83 are arranged at regular intervals along the periphery 82 of the through hole 81. The projections 83 are once bent in a releasing direction of the tapping screw 46 and then folded back to the tightening direction of the same. When the tapping screw 46 is screwed into the through hole 81, sides of the projections 83 contact with the thread grooves of the tapping screw 46. Thereby, the projections 83 bow in the direction retracting from the tapping screw 46, which decreases the tightening torque.

In the above embodiments, three projections are formed on each conductive plate, however the number of the projections may be one or two, or four or more. In addition, although the projections are arranged at regular intervals in the above embodiments, the projections may be arranged at different intervals like eighth and ninth embodiments.

Eighth Embodiment

Figure 11A:
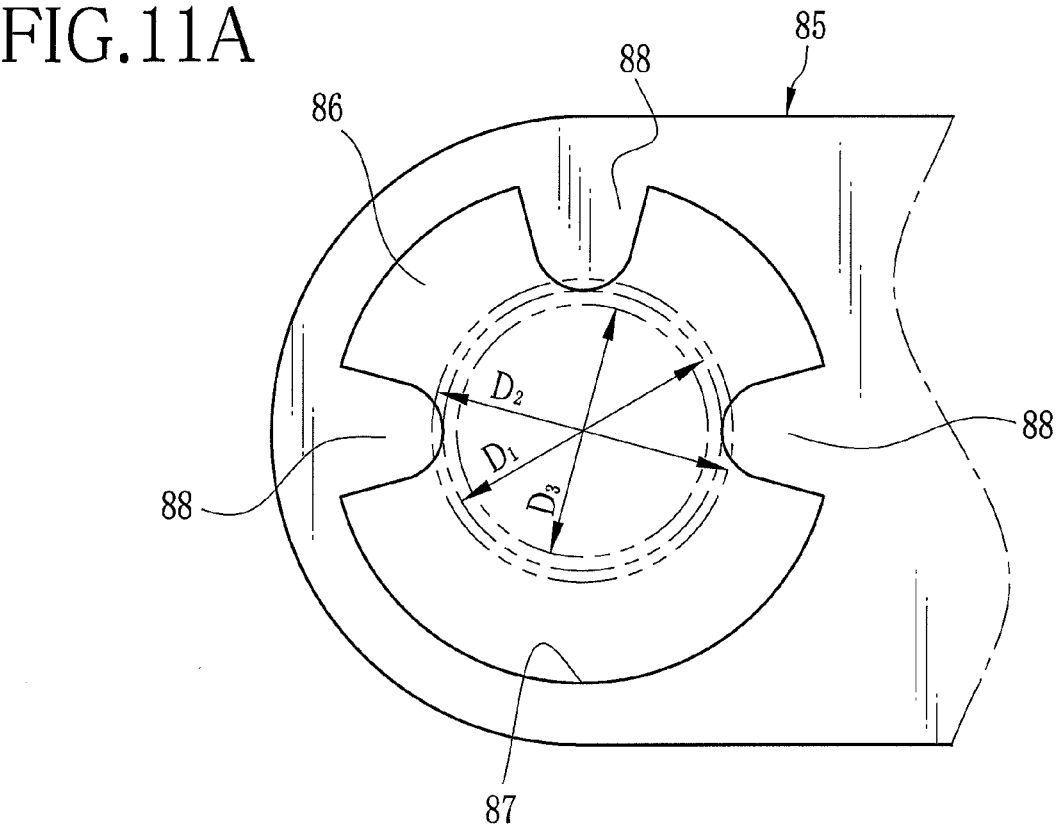
FIG. 11A is a plan view of a conductive plate according to an eighth embodiment and FIG. 11B is a plan view of a conductive plate according to a ninth embodiment.

As shown in FIG. 11A, three projections 88 are formed on a periphery 87 of a through hole 86 of a conductive plate 85. The projections 88 are arranged at different intervals along the periphery 87 of the through hole 86. Tips of the projections 88 are rounded. The projections 88 are arranged at angular intervals of, for example, 90°, 90° and 180°. For this configuration, a thread ridge of the tapping screw 46 is guided to a widest gap between the projections 88. Owing to this, the threading is easily started. The tips of the projections 88 of the conductive plate 85 penetrate into the thread grooves of the tapping screw 46 when the tapping screw 46 is screwed into the through hole 86.

Ninth Embodiment

Figure 11B:
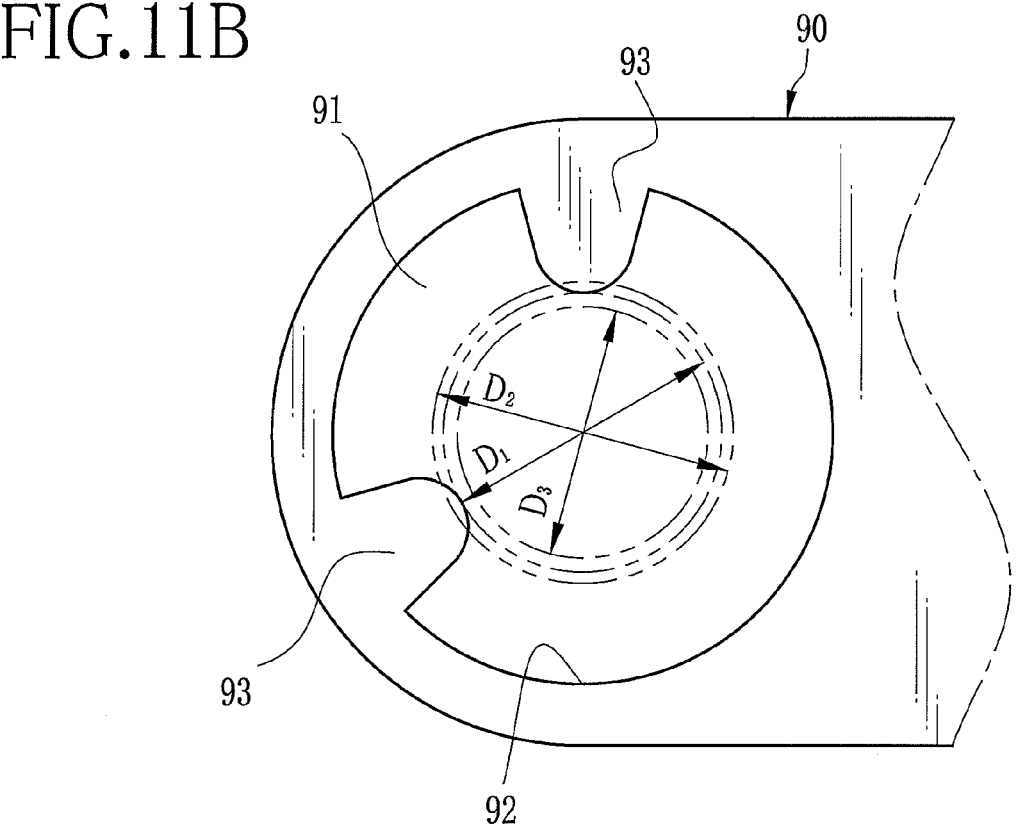

As shown in FIG. 11B, two projections 93 are formed on a periphery 92 of a through hole 91 of a conductive plate 90. The projections 93 are arranged at different intervals along the periphery 92 of the through hole 91. Tips of the projections 93 are rounded. The projections 93 are arranged at angular intervals of, for example, 120° and 240°. For this configuration, the thread ridge of the tapping screw 46 is guided to a widest gap between the projections 93. Owing to this, the threading is easily started. The tips of the projections 93 of the conductive plate 90 penetrate into the thread grooves of the tapping screw 46 when the tapping screw 46 is screwed into the through hole 91.

As for the conductive plate 85 according to the eighth embodiment and the conductive plate 90 according to the ninth embodiment, the tips of the projections 88 and 93 are rounded. The shapes of the tips are not limited to these, but may be formed to follow the outer perimeter of the tapping screw 46, may be formed sharp, or may be others. In addition, the tips of the projections 88 and 93 contact with the tapping screw 46. It is also possible that sides of the projections contact with the tapping screw 46. At this time, the projections may be linearly extended, may be bent, or may be curved in the tightening direction of the tapping screw 46.

Tenth Embodiment

Figure 12A:
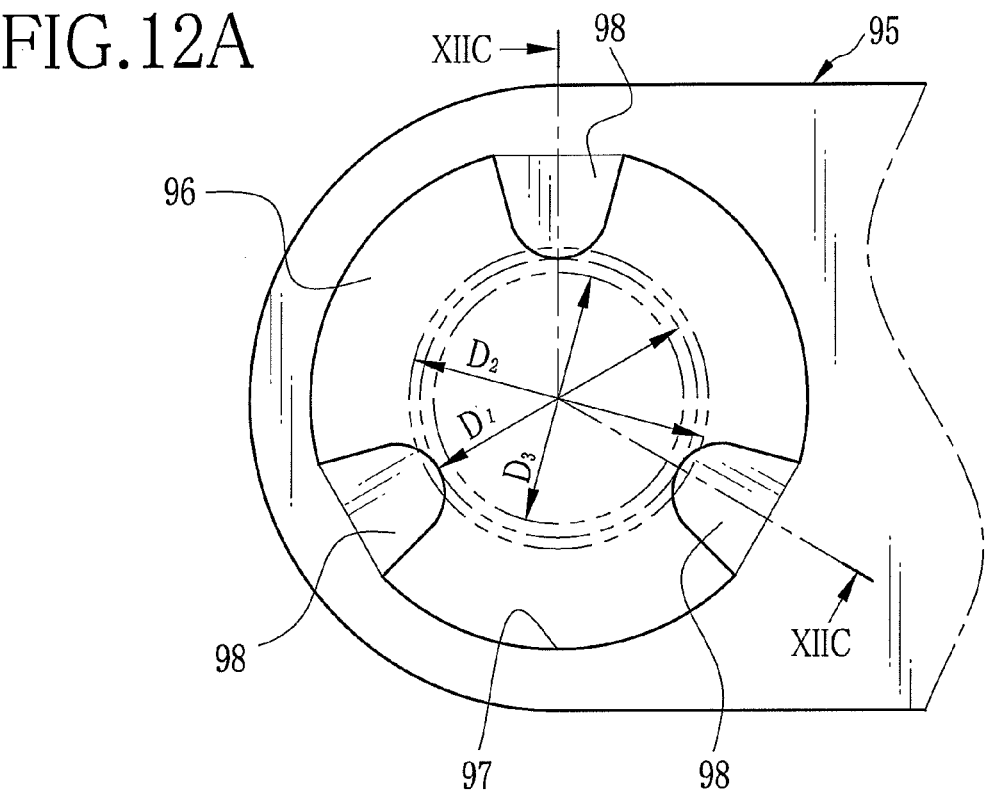
FIG. 12A is a plan view of a conductive plate according to a tenth embodiment.
Figure 12B:
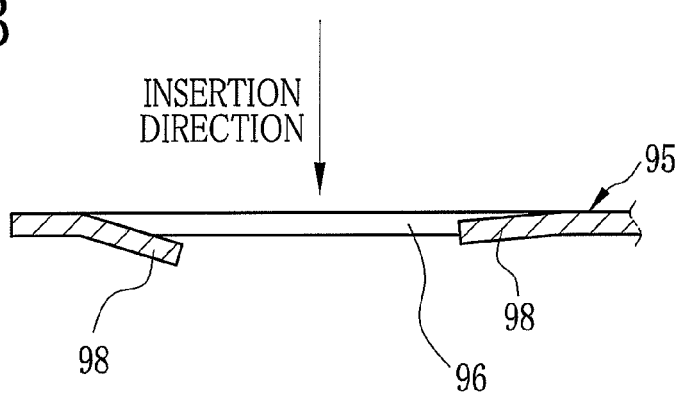
FIG. 12B is a sectional view of the conductive plate taken along a line XIIC-XIIC of FIGS. 12A.
Figure 12C:
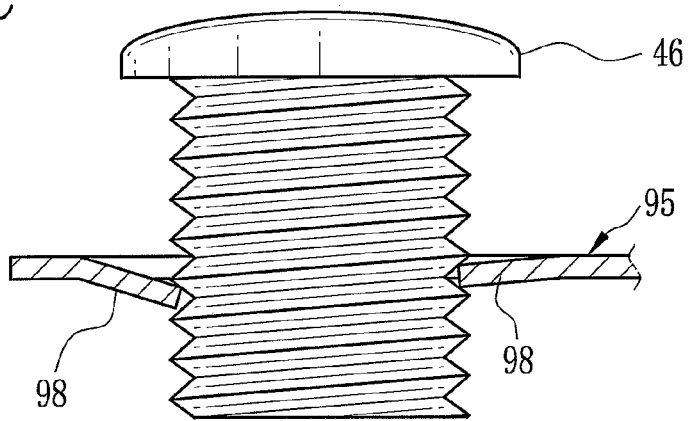
FIG. 12C is a sectional view illustrating the condition that the tapping screw is screwed into the conductive plate according to the tenth embodiment.
Figure 13:
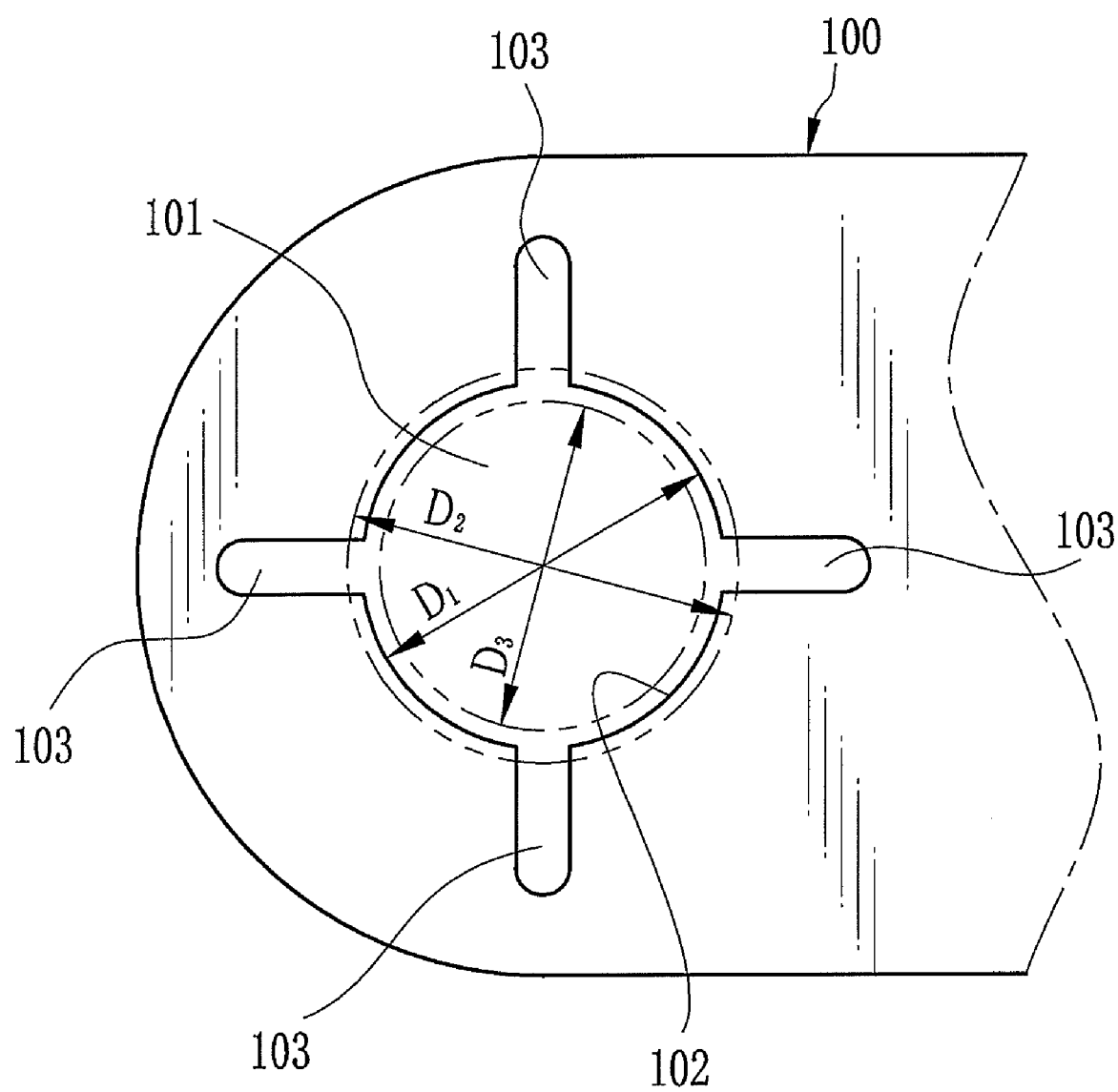
FIG. 13 is a plan view of a conductive plate according to an eleventh embodiment.

In the above embodiments, the projections are formed to protrude on a plane of the conductive plate. The projections may be bent toward the insertion direction of the tapping screw 46 like a tenth embodiment. As shown in FIG. 12A, three projections 98 are formed on a periphery 97 of a through hole 96 of a conductive plate 95. The projections 98 are arranged at regular intervals along the periphery 97 of the through hole 96. Tips of the projections 98 are rounded. As shown in FIG. 12B, the projections 98 are bent at the base thereof toward the insertion direction of the tapping screw 46. The bent angles are different from one another. As shown in FIG. 12C, each projection 98 is bent so as to follow the thread ridge of the tapping screw 46 inserted. Since the projections 98 are bent toward the insertion direction of the tapping screw 46, the thread ridge of the tapping screw 46 is guided when the tapping screw 46 is inserted, thereby facilitating the start of threading. The tips of the projections 98 of the conductive plate 95 penetrate into the thread grooves of the tapping screw 46 when the tapping screw 46 is screwed into the through hole 96.

As for the conductive plate 95 according to the tenth embodiment, the tips of the projections 98 are rounded. The shapes of the tips are not limited to these, but may be formed to follow the outer perimeter of the tapping screw 46, may be formed sharp, or may be others. In addition, the tips of the projections 98 contact with the tapping screw 46. It is also possible that sides of the projections contact with the tapping screw 46. In this case, the thread of the tapping screw 46 can be easily guided as well. At this time, the projections may be linearly extended, may be bent, or may be curved in the tightening direction of the tapping screw 46.

Eleventh Embodiment

A conductive plate 100 according to an eleventh embodiment has four slits 103 radially extending from a through hole 101. A periphery 102 of the through hole 101 penetrate into the thread grooves of the tapping screw 46. The periphery 102 divided by the slits 103 into four parts functions as the tips of the projections. The projections bow in the insertion direction of the tapping screw 46, therefore decreasing the tightening torque. In addition, the dimension of the conducive plate 100 is easily controlled, therefore reducing the production cost thereof.

Twelfth Embodiment

Figure 14A:
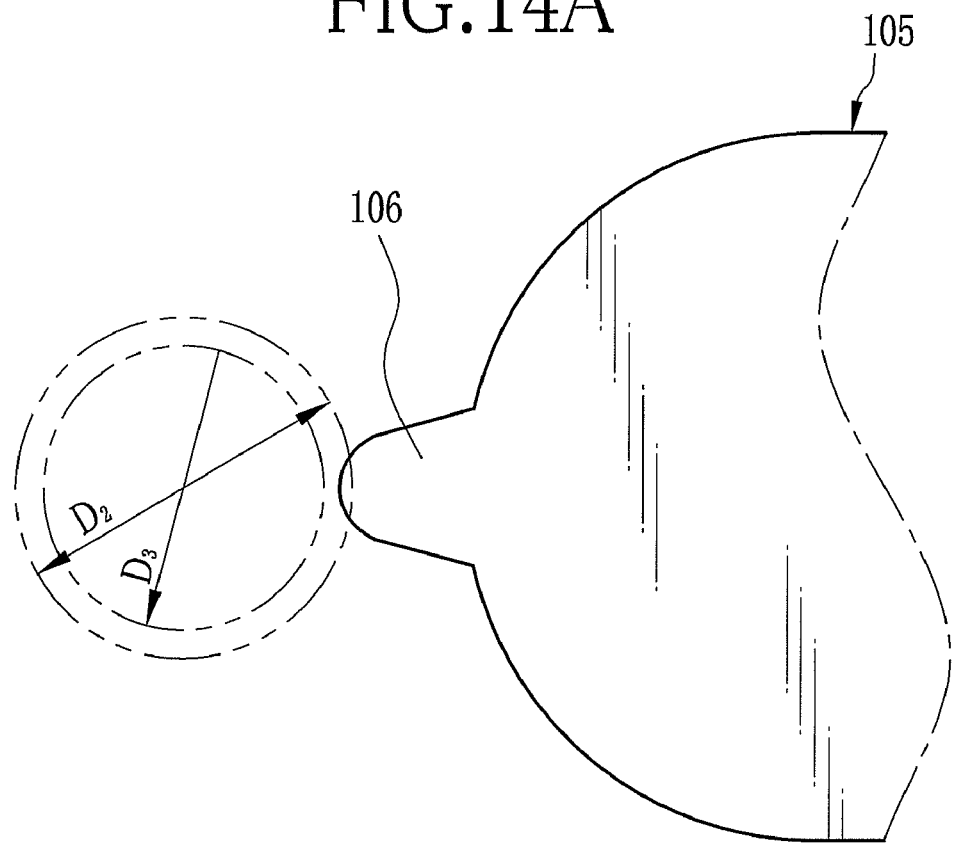
FIG. 14A is a plan view of a conductive plate according to a twelfth embodiment and FIG. 14B is a side elevational view illustrating the relation of the conductive plate according to the twelfth embodiment and the tapping screw.
Figure 14B:
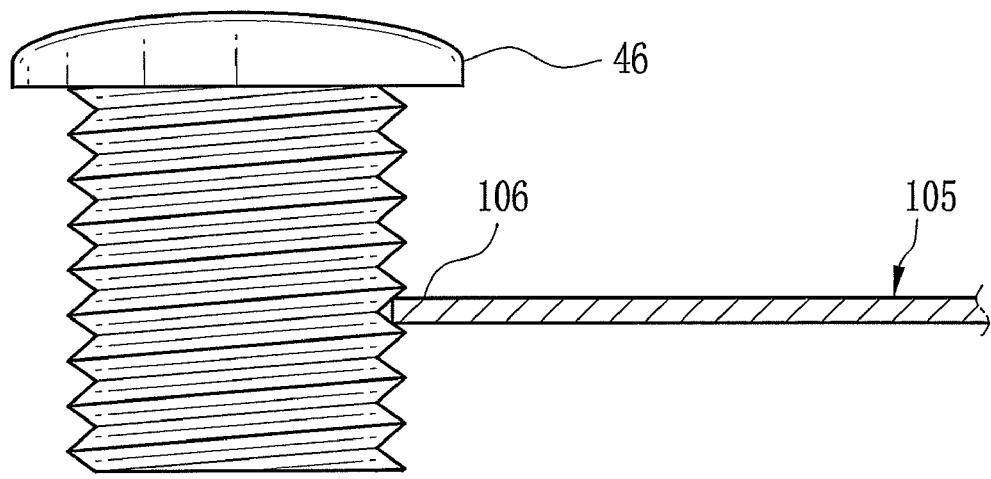

In the above embodiments, the through hole is formed on each conductive plate. However, a conductive plate 105 shown in FIGS. 14A and 14B according to a twelfth embodiment does not have a through hole. That is, the conductive plate 105 has a projection 106 which penetrates into the thread groove of the tapping screw 46. When the projection 106 is penetrated into the thread groove of the tapping screw 46, the conductive plate 105 and the tapping screw 46 contact with each other, and the electric conduction is made between them.

According to the above embodiments, the conductive plate makes the electric conduction between the tapping screw 46 and the grounding member. Besides that, the conductive plate may be used as a spring of the power button 18 or the shutter release button 19.

According to the above embodiments, the conductive plate is made of the metallic plate. Since the conductive plate is for making the electric conduction between the tapping screw 46 and the grounding member, a conductive wire may also be used.

Besides the digital camera, the present invention is applicable to various electronic devices such as mobile phones, personal digital assistances (PDA), personal computers, and the like.

Various changes and modifications are possible in the present invention and may be understood to be within the present invention.

What is claimed is:

1. An electronic device comprising:
    an insulating housing;
    a circuit board component and an insulating member provided inside said housing;
    a tapping screw for fixing said housing to said insulating member;
    a metallic conductive plate held between said housing and said insulating member, said conductive plate connecting said tapping screw to a part of said circuit board component serving as a reference potential, said conductive plate having a thickness smaller than a thread pitch of said tapping screw; and
    at least one projection formed on said conductive plate, said projection penetrating into a thread groove of said tapping screw.

2. The electronic device according to claim 1, wherein said conductive plate has a through hole to which said tapping screw is inserted, said projection being formed on a periphery of said through hole.

3. The electronic device according to claim 1, wherein said conductive plate comprising:
    a through hole to which said tapping screw is inserted; and
    a plurality of slits radially extending from said through hole, wherein
    said projection is formed between the adjacent two slits.

4. The electronic device according to claim 2, wherein when a diameter of a circle inscribed in a tip of said projection is $D_1$, a major diameter of external thread of said tapping screw is $D_2$, and a minor diameter of external thread of said tapping screw is $D_3$, the following condition is satisfied:

$$D_3 < D_1 < D_2.$$

5. The electronic device according to claim 4, wherein said tip of said projection has a shape to follow an outer perimeter of said tapping screw.

6. The electronic device according to claim 4, wherein said tip of said projection is sharp.

7. The electronic device according to claim 4, wherein said projection is curved in a tightening direction of said tapping screw.

8. The electronic device according to claim 4, wherein said projections are formed at different intervals on said periphery of said through hole.

9. The electronic device according to claim 4, wherein said projection is bent toward an insertion direction of said tapping screw.

* * * * *